(12) United States Patent
Jens et al.

(10) Patent No.: US 9,861,037 B2
(45) Date of Patent: Jan. 9, 2018

(54) MECHANICAL PRODUCE HARVESTER WITH GATHERING BELTS

(71) Applicant: DOLE FRESH VEGETABLES, INC., Westlake Village, CA (US)

(72) Inventors: Stephen C. Jens, Winchester, MA (US); Serafin Albarran, Salinas, CA (US); Richard Bascou, Westlake Village, CA (US); Dennis J. Castillo, Salinas, CA (US); Frank Edward Davis, Chicago, IL (US); Ignacio Rodriguez Figueroa, Little Rock, AR (US); Raul Machuca, Prunedale, CA (US); Kevin Nash, Salinas, CA (US); Jose Roman, Yuma, AZ (US)

(73) Assignee: Dole Fresh Vegetables, Inc., Westlake Village, CA (US)

( * ) Notice: Subject to any disclaimer, the term of this patent is extended or adjusted under 35 U.S.C. 154(b) by 0 days.

(21) Appl. No.: 14/865,406

(22) Filed: Sep. 25, 2015

(65) Prior Publication Data

US 2016/0143223 A1 May 26, 2016

Related U.S. Application Data

(63) Continuation of application No. 12/914,905, filed on Oct. 28, 2010, now abandoned.

(51) Int. Cl.
*A01D 45/26* (2006.01)
*A01D 45/00* (2006.01)
(Continued)

(52) U.S. Cl.
CPC ......... *A01D 45/001* (2013.01); *A01D 45/023* (2013.01); *A01D 45/26* (2013.01); *A01D 45/263* (2013.01); *A01D 61/02* (2013.01)

(58) Field of Classification Search
USPC ........................................... 56/327.1
See application file for complete search history.

(56) References Cited

U.S. PATENT DOCUMENTS

| 1,168,467 A | 1/1916 | Bell |
| 2,314,681 A | 3/1943 | Beatty |
| (Continued) | | |

FOREIGN PATENT DOCUMENTS

| AU | 2009/201445 A1 | 12/2009 |
| DE | 2707261 A1 | 8/1978 |
| (Continued) | | |

OTHER PUBLICATIONS

Extended European Search Report received for European Patent Application No. 11867125.4, mailed on Nov. 6, 2014, 6 pages.
(Continued)

*Primary Examiner* — Alicia Torres
(74) *Attorney, Agent, or Firm* — Polsinelli PC

(57) ABSTRACT

A mechanical harvester for harvesting a produce with a stem/core planted in a field includes a chassis, and a cutting device and a transport assembly connected to the chassis. The cutting device is configured to cut the stem/core of the produce. The transport assembly is configured to transport the produce using a movable first belt with a first set of produce grippers and a movable second belt with a second set of produce grippers. When the produce is held between the first set and second set of produce grippers, a portion of the first set of produce grippers opposes a portion of the second set of produce grippers. The opposing produce grippers are configured to compress and exert a force on the produce to hold the produce between the movable first and second belts.

33 Claims, 12 Drawing Sheets

(51) Int. Cl.
  *A01D 45/02* (2006.01)
  *A01D 61/02* (2006.01)

(56) References Cited

U.S. PATENT DOCUMENTS

| | | | |
|---|---|---|---|
| 2,528,805 | A | 11/1950 | Walz et al. |
| 2,645,889 | A | 7/1953 | Warner |
| 2,791,083 | A | 5/1957 | Richardson |
| 2,833,357 | A | 5/1958 | Lust |
| 2,855,058 | A | 10/1958 | Krier et al. |
| 3,194,318 | A | 7/1965 | Boyer |
| 3,339,354 | A | 9/1967 | Kessler |
| 3,388,538 | A | 6/1968 | Markham |
| 3,485,023 | A | 12/1969 | See |
| 3,497,013 | A | 2/1970 | Baker |
| 3,503,196 | A | 3/1970 | Jarrett |
| 3,543,493 | A | 12/1970 | Duda, Jr. |
| 3,586,108 | A | 6/1971 | Wedgeworth et al. |
| 3,587,216 | A | 6/1971 | Camarillo et al. |
| 3,658,132 | A | 4/1972 | Akesson et al. |
| 3,680,291 | A | 8/1972 | Soteropulos |
| 3,690,049 | A | 9/1972 | Roberson |
| RE27,674 | E | 6/1973 | Grether et al. |
| 3,791,117 | A | 2/1974 | Lawrence |
| 3,800,518 | A | 4/1974 | Baggiolini et al. |
| 3,808,783 | A | 5/1974 | Sutherland et al. |
| 3,821,987 | A | 7/1974 | Shepardson et al. |
| 3,827,222 | A | 8/1974 | Toti |
| 3,827,503 | A | 8/1974 | Hansen |
| 3,853,016 | A | 12/1974 | Lane, III et al. |
| 3,858,660 | A | 1/1975 | Wadsworth |
| 3,982,384 | A | 9/1976 | Rohweder et al. |
| 4,009,557 | A | 3/1977 | Reicks |
| 4,036,123 | A | 7/1977 | Conkey |
| 4,090,296 | A | 5/1978 | Di Piero |
| 4,094,238 | A | 6/1978 | Striplin |
| 4,185,696 | A | 1/1980 | Williams et al. |
| 4,211,161 | A | 7/1980 | Jourdan et al. |
| 4,244,161 | A | 1/1981 | Guiter |
| 4,337,612 | A | 7/1982 | Dean et al. |
| 4,353,201 | A | 10/1982 | Pierce et al. |
| 4,453,458 | A | 6/1984 | Altman |
| 4,798,281 | A | 1/1989 | Egger |
| 4,805,388 | A * | 2/1989 | Kell ............... A01D 45/023 474/164 |
| 4,856,715 | A | 8/1989 | Fordyce |
| 5,056,223 | A | 10/1991 | Buck et al. |
| 5,354,569 | A | 10/1994 | Brown et al. |
| 5,404,700 | A | 4/1995 | Kobuchi et al. |
| 5,560,190 | A | 10/1996 | Ottaway |
| 5,934,054 | A | 8/1999 | Landeis |
| 6,036,989 | A | 3/2000 | Ellis |
| 6,298,865 | B1 | 10/2001 | Brown et al. |
| 6,378,281 | B1 | 4/2002 | Ottaway |
| 6,467,248 | B2 | 10/2002 | Brown |
| 6,607,769 | B1 | 8/2003 | Krymskiy et al. |
| 6,622,467 | B1 | 9/2003 | Ottaway |
| 6,766,948 | B1 | 7/2004 | Burns |
| 6,996,964 | B2 | 2/2006 | Maconachy et al. |
| 7,062,899 | B2 | 6/2006 | Maconachy et al. |
| 7,395,653 | B2 | 7/2008 | de Groot et al. |
| 7,703,367 | B1 | 4/2010 | Bayless |
| 7,712,296 | B2 | 5/2010 | Costa et al. |
| 7,867,536 | B2 | 1/2011 | Kargenian |
| 8,074,365 | B2 | 12/2011 | Nash et al. |
| 8,136,335 | B2 | 3/2012 | Dobson |
| 8,312,701 | B1 | 11/2012 | Albarran et al. |
| 8,631,635 | B2 | 1/2014 | Albarran et al. |
| 2002/0104302 | A1 | 8/2002 | Brown |
| 2002/0164407 | A1 | 11/2002 | Wolfe et al. |
| 2003/0182808 | A1 | 10/2003 | Mireles et al. |
| 2004/0149545 | A1 | 8/2004 | Tarantino et al. |
| 2004/0161509 | A1 | 8/2004 | Maconachy |
| 2004/0187465 | A1 | 9/2004 | Tarantino et al. |
| 2004/0187466 | A1 | 9/2004 | Garcia et al. |
| 2004/0187467 | A1 | 9/2004 | Garcia et al. |
| 2004/0265437 | A1 | 12/2004 | Rianda |
| 2005/0066824 | A1 | 3/2005 | Brown et al. |
| 2005/0112256 | A1 | 5/2005 | Mitchell et al. |
| 2005/0233039 | A1 | 10/2005 | Wolfe et al. |
| 2006/0090780 | A1 | 5/2006 | Brown et al. |
| 2007/0031541 | A1 | 2/2007 | Kargenian |
| 2007/0095041 | A1 | 5/2007 | de Groot et al. |
| 2007/0221072 | A1 | 9/2007 | de Groot et al. |
| 2009/0249630 | A1 | 10/2009 | Deiman et al. |
| 2010/0257984 | A1 | 10/2010 | Scaroni et al. |
| 2010/0291276 | A1 | 11/2010 | Groot et al. |
| 2012/0102907 | A1 | 5/2012 | Jens et al. |
| 2012/0311989 | A1 | 12/2012 | Albarran et al. |
| 2013/0111870 | A1 | 5/2013 | Albarran et al. |

FOREIGN PATENT DOCUMENTS

| | | | |
|---|---|---|---|
| EP | 0095435 A2 * | 11/1983 | ........... A01D 45/023 |
| GB | 1591434 A | 6/1981 | |
| JP | 2000-236729 A | 9/2000 | |
| WO | 94/26134 A1 | 11/1994 | |
| WO | 97/02758 A1 | 1/1997 | |
| WO | 98/06273 A1 | 2/1998 | |
| WO | 00/49849 A1 | 8/2000 | |
| WO | 02/101888 A2 | 12/2002 | |
| WO | 03/015541 A1 | 2/2003 | |
| WO | 2005/082033 A2 | 9/2005 | |
| WO | 2005/082033 A3 | 10/2006 | |
| WO | 2007/066190 A2 | 6/2007 | |
| WO | 2007/069898 A1 | 6/2007 | |
| WO | 2010/018543 A1 | 2/2010 | |

OTHER PUBLICATIONS

International Preliminary Report on Patentability received for PCT Patent Application No. PCT/US2011/057915, mailed on May 10, 2013, 7 pages.

International Preliminary Report on Patentability received for PCT Patent Application No. PCT/US2011/057917, mailed on Dec. 27, 2013, 6 pages.

International Search Report and Written Opinion received for PCT Patent Application No. PCT/US2011/057915, mailed on Nov. 15, 2011, 11 pages.

International Search Report and Written Opinion received for PCT Patent Application No. PCT/US2011/057917, mailed on Mar. 8, 2012, 7 pages.

Non Final Office Action received for U.S. Appl. No. 13/663,411, mailed on Feb. 27, 2013, 7 pages.

Non Final Office Action received for U.S. Appl. No. 14/150,617, mailed on Sep. 18, 2014, 8 pages.

Non Final Office Action received for U.S. Appl. No. 12/914,905, mailed on Oct. 18, 2011, 9 pages.

Final Office Action received for U.S. Appl. No. 12/914,905, mailed on Mar. 19, 2012, 9 pages.

Non Final Office Action received for U.S. Appl. No. 13/158,276, mailed on Mar. 2, 2012, 6 pages.

Notice of Allowance received for U.S. Appl. No. 13/158,276, mailed on Jul. 18, 2012, 7 pages.

Notice of Allowance received for U.S. Appl. No. 13/663,411, mailed on Sep. 16, 2013, 6 pages.

Notice of Allowance received for U.S. Appl. No. 14/150,617, mailed on Mar. 5, 2015, 5 pages.

Office Action received for Chilean Patent Application No. 1165-13, mailed on Nov. 7, 2014, 7 pages. (official copy only) (see communication 37 CFR § 1.98(a) (3)).

Office Action received for Mexican Patent Application No. MXA2013004791, mailed on May 28, 2015, 3 pages.

Office Action received for New Zealand Patent Application No. 610130, mailed on Oct. 18, 2013, 2 pages.

Non Final Office Action received for U.S. Appl. No. 14/791,117, mailed on Mar. 1, 2016, 11 pages.

(56) References Cited

OTHER PUBLICATIONS

Notice of Allowance received for U.S. Appl. No. 14/791,117, mailed on Sep. 27, 2016, 5 pages.

* cited by examiner

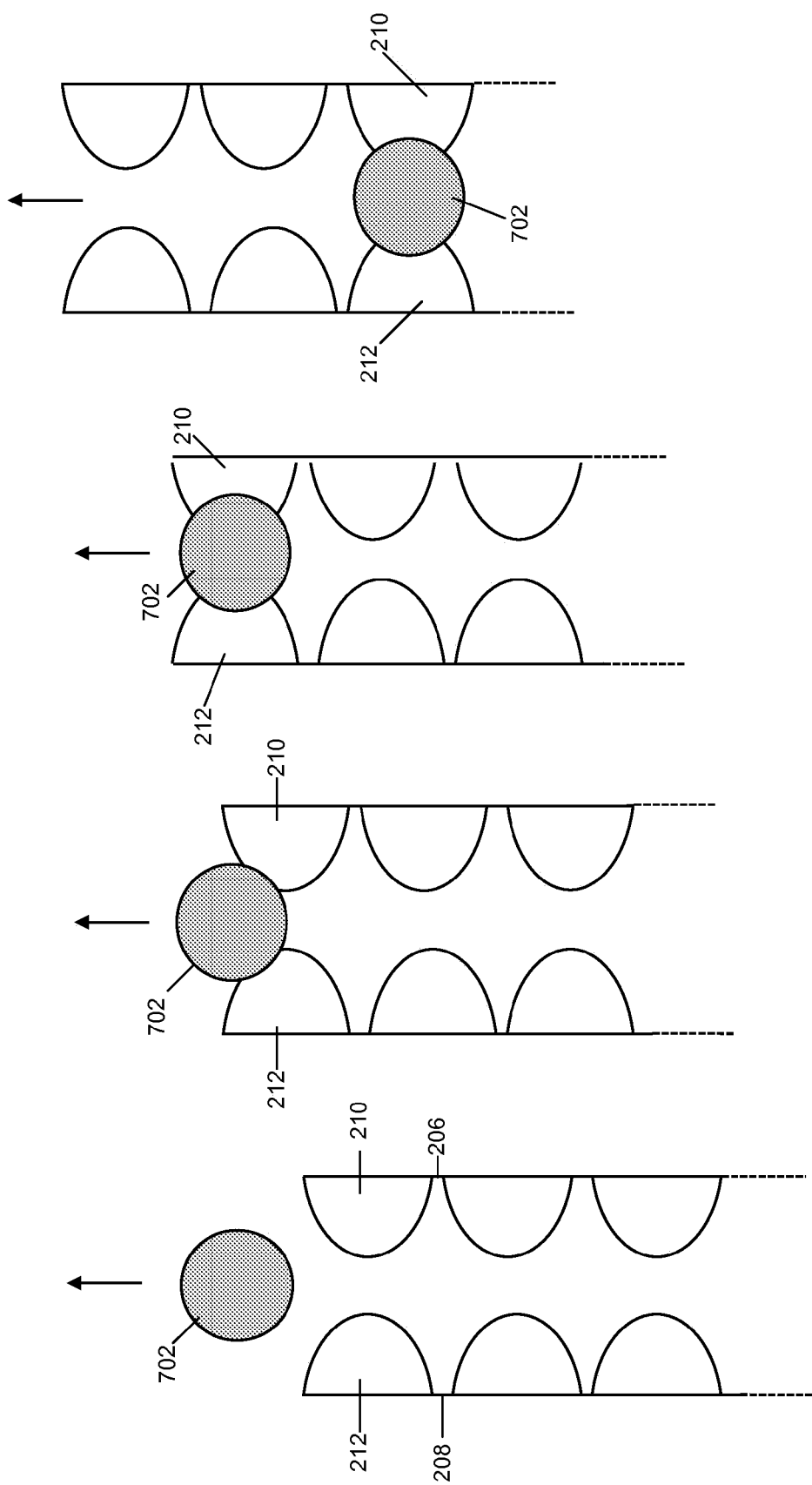

MECHANICAL PRODUCE HARVESTER WITH GATHERING BELTS

CROSS-REFERENCE TO RELATED APPLICATION

This application is a continuation application of U.S. patent application Ser. No. 12/914,905, filed on Oct. 28, 2010, which is incorporated herein by reference in its entirety.

BACKGROUND

1. Field

The present application relates to an apparatus and method for mechanically harvesting agricultural products and, more particularly, to a mechanical harvester for harvesting produce having a stem/core, which is planted in a field, such as iceberg lettuce, romaine lettuce, celery, and cabbage.

2. Description of the Related Art

Typically, harvesting of produce having a stem or core, such as romaine lettuce, iceberg lettuce, celery, and cabbage, in the field is predominately done by hand. The harvesting procedure involves several steps. These steps include a person cutting the stem/core of the produce while the produce is planted in the ground, and placing the cut produce on a moving platform for subsequent processing and packing. Further, in some instances, the core of the produce is removed or extracted from the leaves by hand. This step is often performed by packers that sell prepared lettuce or prepackaged salad mixes.

Previously, harvesting systems have utilized conveyor belts for movement of produce from the field. However, these conveyor belts utilize gripping mechanisms, such as teeth or pins, attached to the conveyer belts. These gripping mechanisms may pierce and damage the produce as it is transported by the conveyor belt. Produce, particularly headed lettuces such as iceberg and romaine lettuces, are susceptible to damage by teeth or pins as gripping mechanisms for transport.

SUMMARY

In one exemplary embodiment, a mechanical harvester for harvesting produce with a stem or core planted in a field is provided. The mechanical harvester includes a chassis, and a cutting device and a transport assembly connected to the chassis. The cutting device is configured to cut the stem or core of the produce. The transport assembly is configured to transport the produce cut by the cutting device. The transport assembly includes a movable first belt and a movable second belt. The movable first belt includes a first set of produce grippers and the movable second belt includes a second set of produce grippers. When the produce cut by the cutting device is held between the first set and second set of produce grippers, a portion of the first set of produce grippers opposes a portion of the second set of produce grippers. The opposing produce grippers are configured to compress and exert a force on the produce to hold the produce between the movable first and second belts.

DESCRIPTION OF THE FIGURES

FIGS. 10A, 10B, 10C, and 10D illustrate an exemplary method of transporting produce with the mechanical harvester.

DETAILED DESCRIPTION

To provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
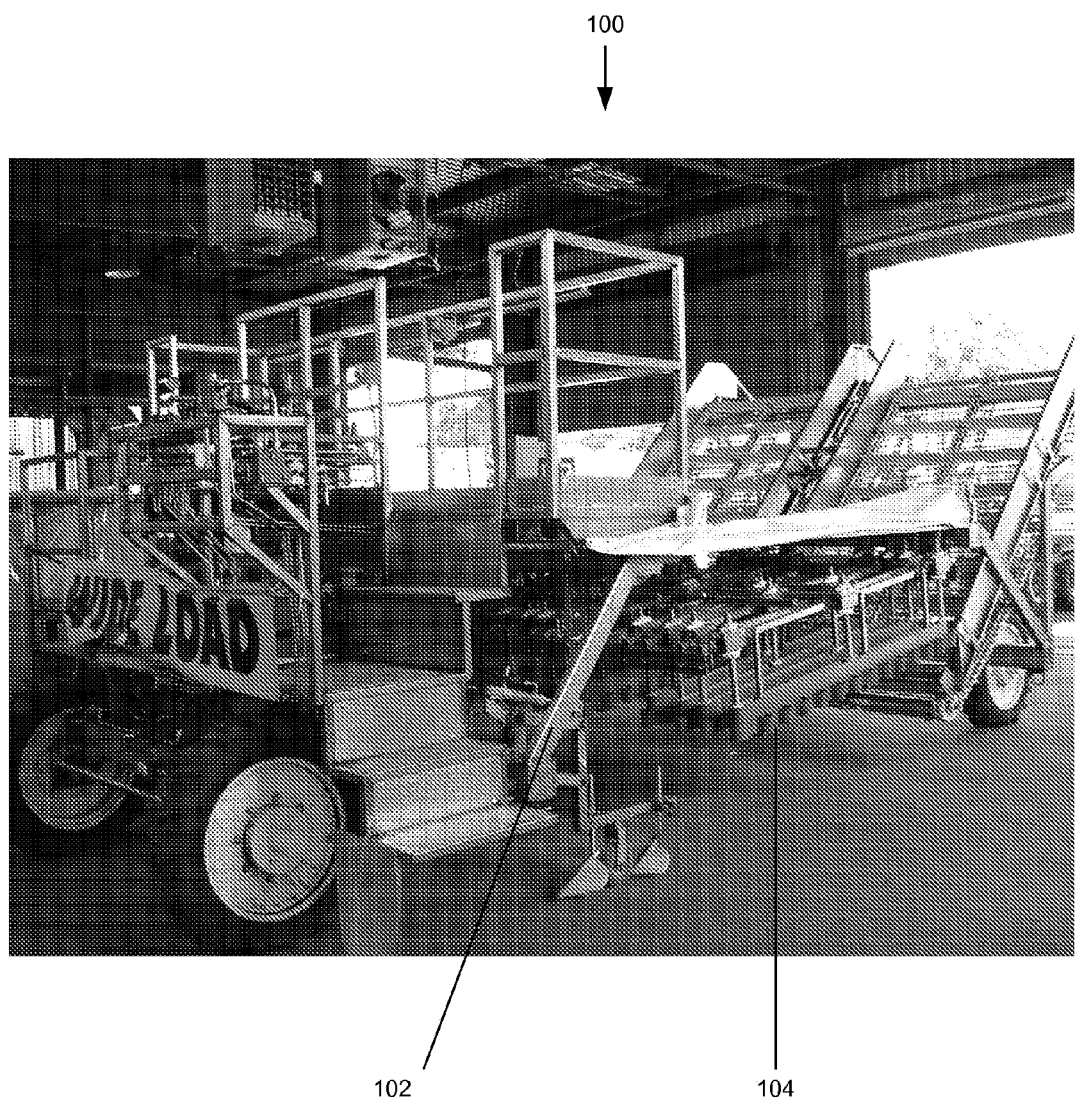
FIG. 1 illustrates an exemplary embodiment of a mechanical harvester.

With reference to FIG. 1, an exemplary mechanical harvester 100 is depicted. As described below, mechanical harvester 100 is configured to harvest produce having a stem, core, or root, such as romaine lettuce, iceberg lettuce, celery, cabbage, or the like. To harvest produce in the field, mechanical harvester 100 moves through the field of produce, while cutting the stems/cores of the produce or cutting the produce from its stem/core to release the produce, lifting the released produce from the ground, and transporting the released produce. The produce may be transported to a storage bin or container for future processing, or to a processing platform connected to mechanical harvester 100 for more immediate processing. Processing may include inspection, sorting, trimming, decoring, washing, and packaging, for example.

As depicted in FIG. 1, mechanical harvester 100 includes a chassis 102. A cutting device is coupled to chassis 102 to cut the stem/core of the produce.

Figure 2:
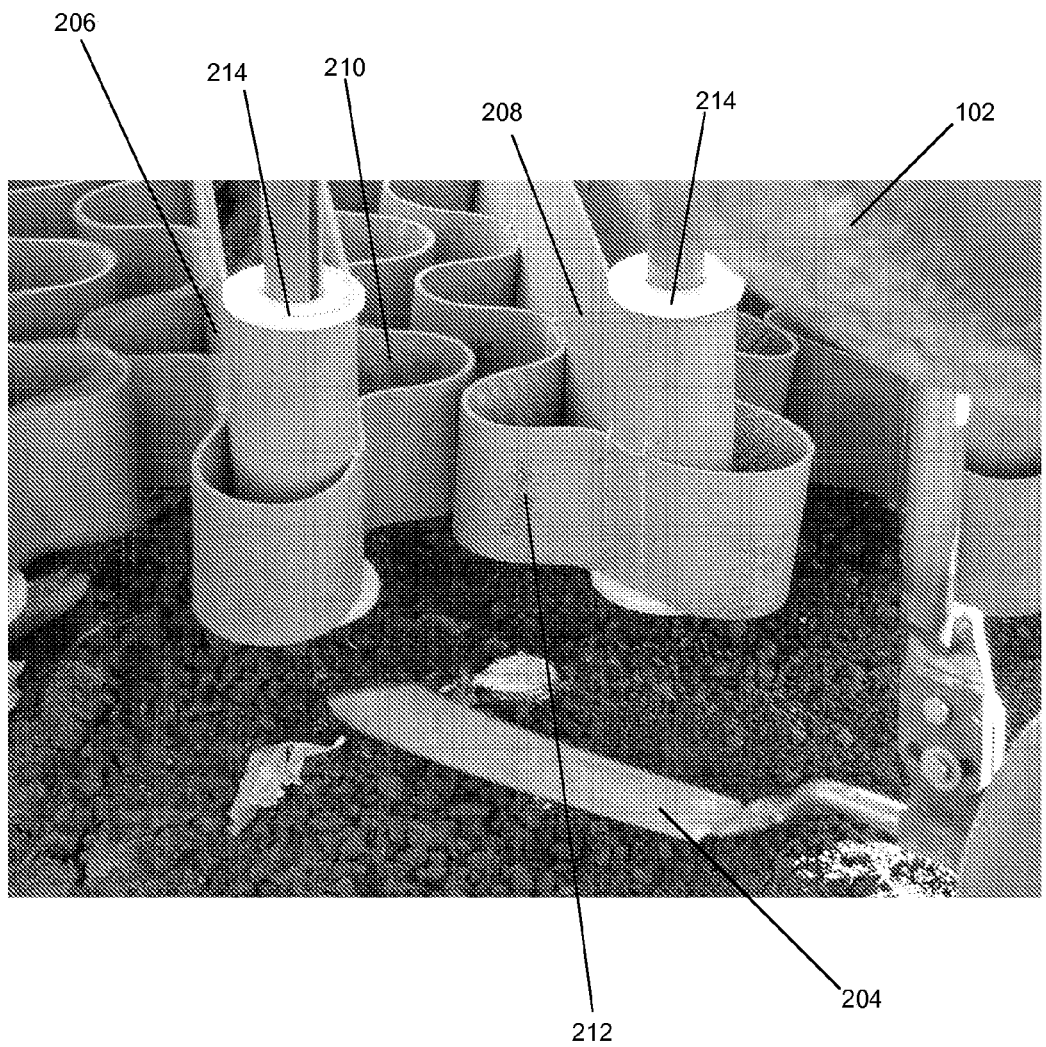
FIG. 2 illustrates an exemplary cutting device of the mechanical harvester.

FIG. 2 depicts the cutting device as a flat blade 204. In the embodiment shown in FIG. 2, flat blade 204 is configured to be fixed to mechanical harvester 100 (FIG. 1). As mechanical harvester 100 (FIG. 1) moves through the field, flat blade 204 moves with mechanical harvester 100 (FIG. 1) cutting produce in the field. The position of flat blade 204 may be adjusted during harvesting to optimize the angle and height of flat blade 204 to cut a particular type of produce. Flat blade 204 may be adjusted to change the angle of flat blade 204 in relation to the ground and the angle of flat blade 204 in relation to the direction of motion of harvester 100 (FIG. 1).

Figure 3:
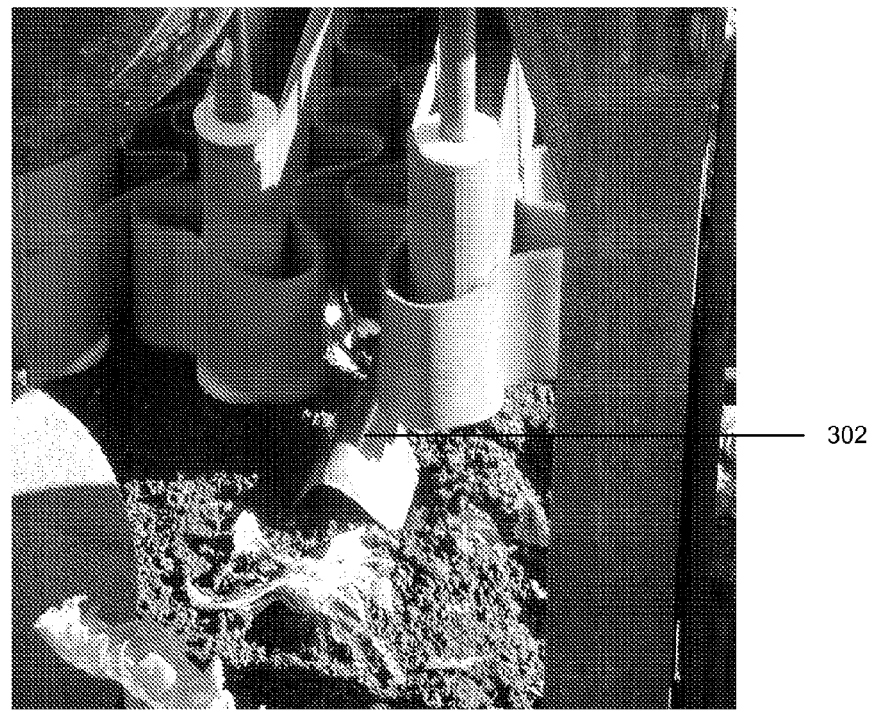
FIG. 3 illustrates another exemplary cutting device of the mechanical harvester.

In addition to flat blade 204, the cutting device may be, but is not limited to, a decoring blade, a knife, a band saw, an ultrasonic knife, a vibrating knife, or a water jet-cutting device. For example, FIG. 3 depicts the cutting device as a decoring blade 302. Decoring blade 302 is configured to both cut the produce from its stem/core and decore the cut produce. Decoring during harvesting in the field can reduce handling of the produce. A reduction of handling increases efficiency and reduces the risk of damage to the produce.

Although a single cutting device has been depicted, it should be recognized that multiple cutting devices may be used to harvest produce from multiple rows of produce at a time. For example, in the embodiment shown in FIG. 2, flat blade 204 cuts produce from a single row of produce at a time. As such, multiple flat blades 204 may be included in mechanical harvester 100 (FIG. 1) to cut produce from multiple rows of produce at one time. In other words, mechanical harvester 100 (FIG. 1) can harvest from at least an equal number of rows of produce as the number of flat blades 204 that are included in mechanical harvester 100.

Figure 4:
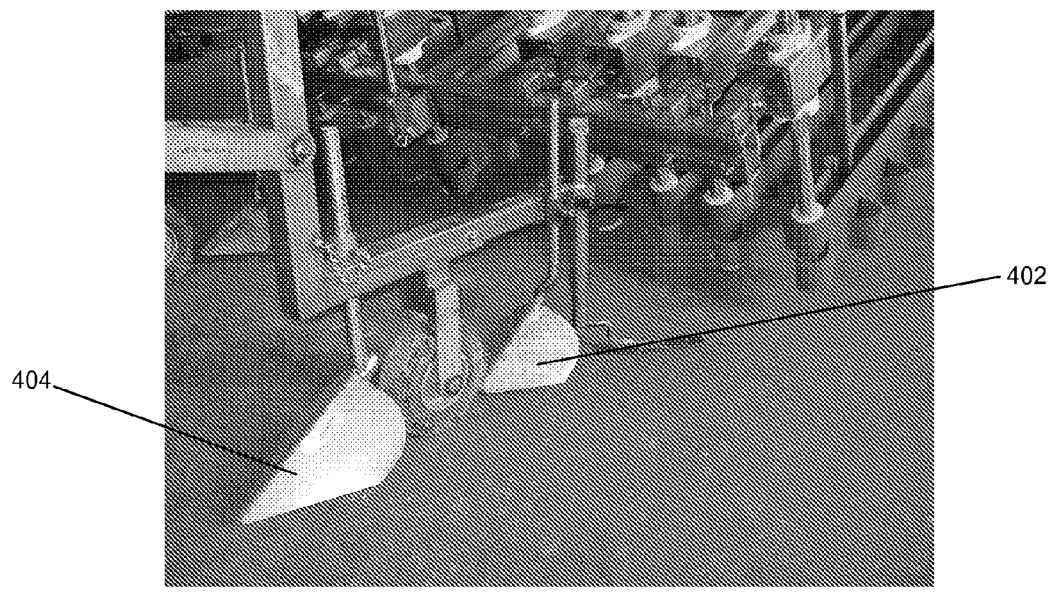
FIG. 4 illustrates an exemplary plow along with an exemplary cutting device of the mechanical harvester.

As depicted in FIG. 4, mechanical harvester 100 (FIG. 1) may also include a plow 402 positioned in front of a cutting device. In a position forward to the cutting device, plow 402 will reach the produce before the cutting device when mechanical harvester 100 (FIG. 1) is moving. Plow 402 keeps vegetation and other debris from collecting on the cutting device. In addition, mechanical harvester 100 (FIG. 1) may include more than one plow, such as plow 404, in a position forward to a wheel of mechanical harvester 100 (FIG. 1). Plow 404 keeps vegetation and other debris from collecting on the wheel of the mechanical harvester 100 (FIG. 1).

As depicted in FIG. 1, a transport assembly 104 is coupled to chassis 102. As depicted in FIG. 2, transport assembly 104 includes movable belts 206 and 208 configured to hold, lift, and transport the produce after the produce is cut from its stem/core. As will be described in detail below, produce gripper 210 and opposing produce gripper 212 are coupled to movable belts 206 and 208, respectively. Produce gripper 210 and opposing produce gripper 212 are used to hold, lift from the ground, and transport the produce. For example, with reference to FIG. 7, a head of iceberg lettuce 702 is depicted as having been cut from its stem/core. As depicted in FIG. 8, produce gripper 210 and opposing produce gripper 212 hold, lift from the ground, and transport iceberg lettuce head 702.

With reference again to FIG. 2, movable belts 206 and 208 are attached to wheels 214 that, when rotated, will move the movable belts 206 and 208. Movable belts 206 and 208 can be conveyor belts.

Figure 5:
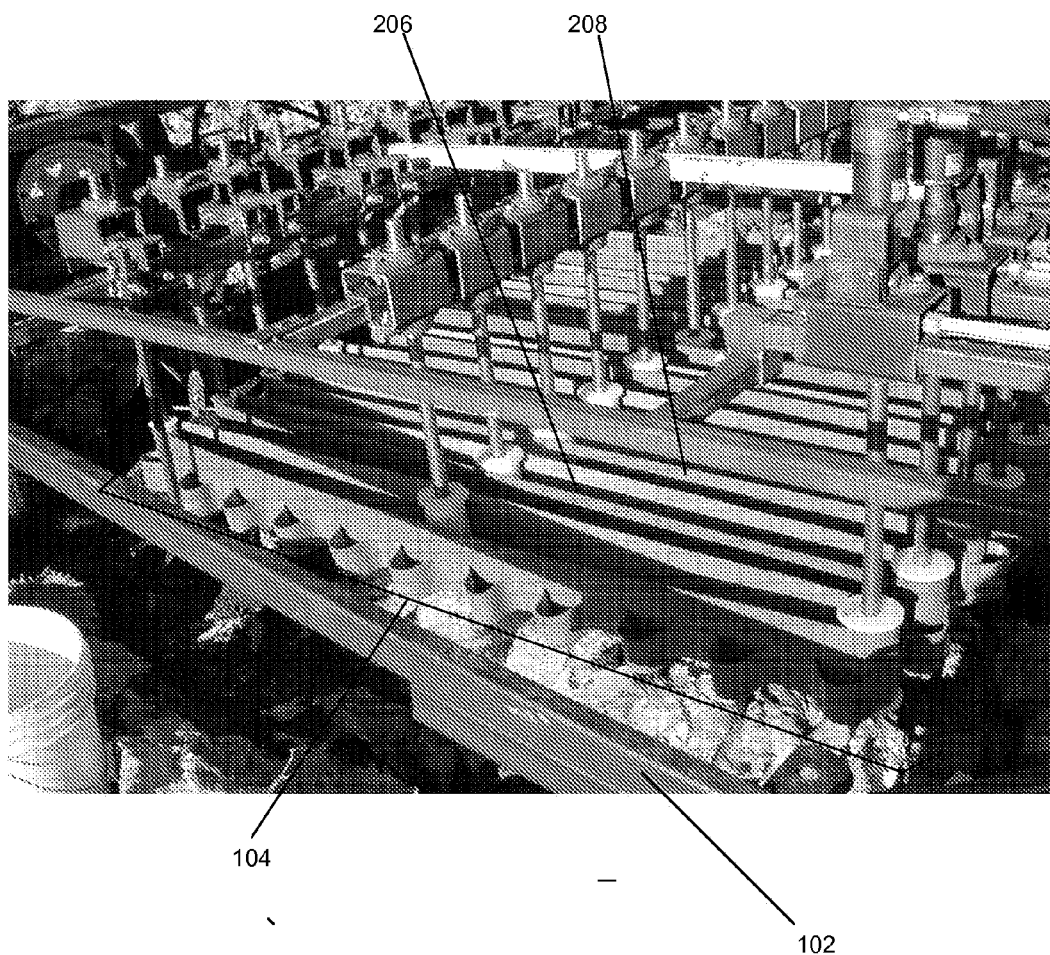
FIG. 5 illustrates a perspective view of movable belts of the mechanical harvester.
Figure 6A:
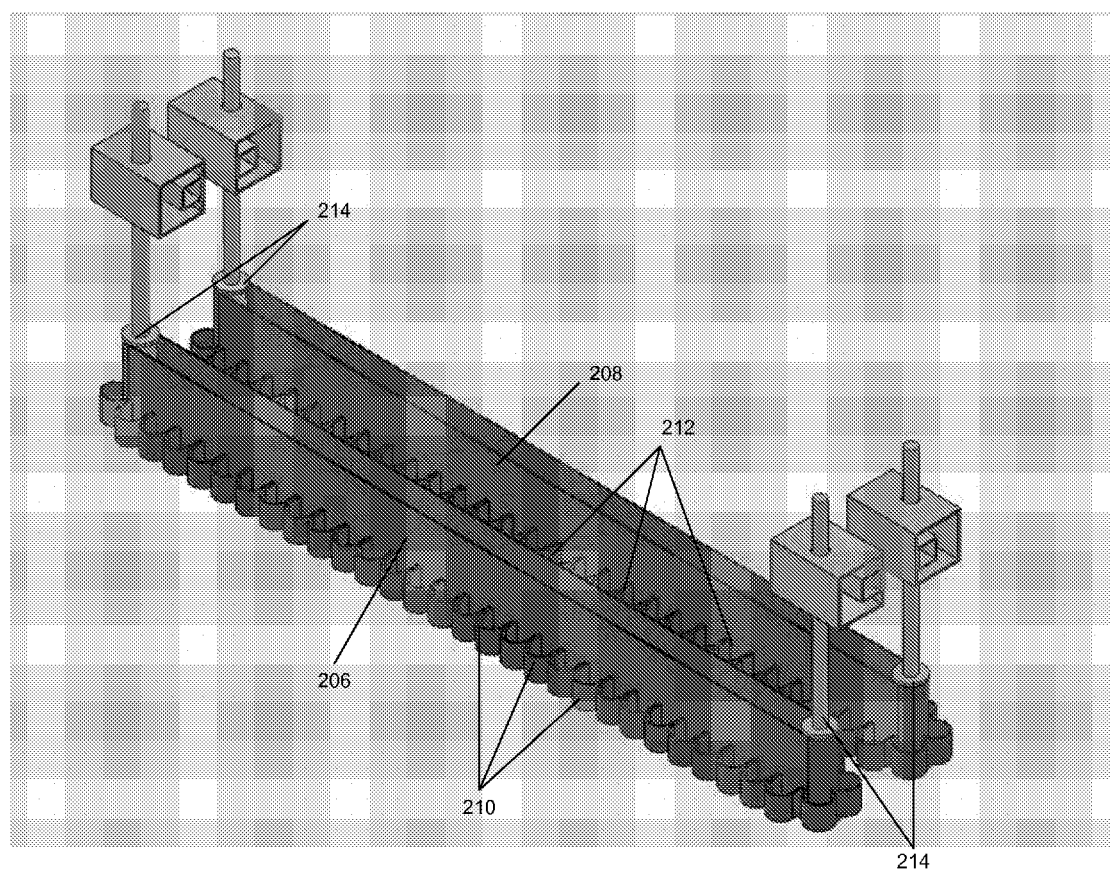
FIG. 6A illustrates an exemplary schematic of the movable belts of the mechanical harvester.
Figure 6B:
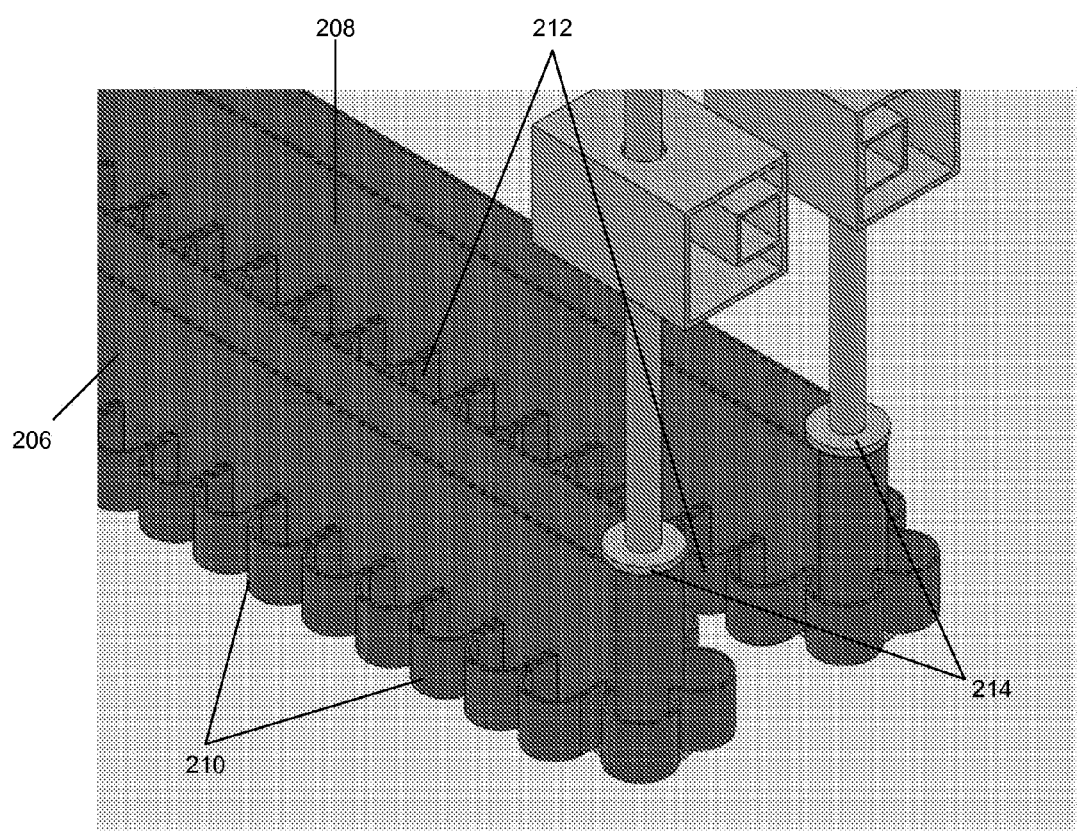
FIG. 6B illustrates another exemplary schematic of the movable belts of the mechanical harvester.

As depicted in FIGS. 6A and 6B, movable belts 206 and 208 are in a substantially parallel configuration. As depicted in FIG. 5, movable belts 206 and 208 can also be inclined relative to the ground from the front end to the rear end of transport assembly 104. In this way, movable belts 206 and 208 are configured to lift the cut produce and transport the cut produce to a platform for further processing or a storage bin. As also depicted in FIG. 5, transport assembly 104 may include multiple sets of movable belts for harvesting from multiple rows of produce.

Figure 6C:
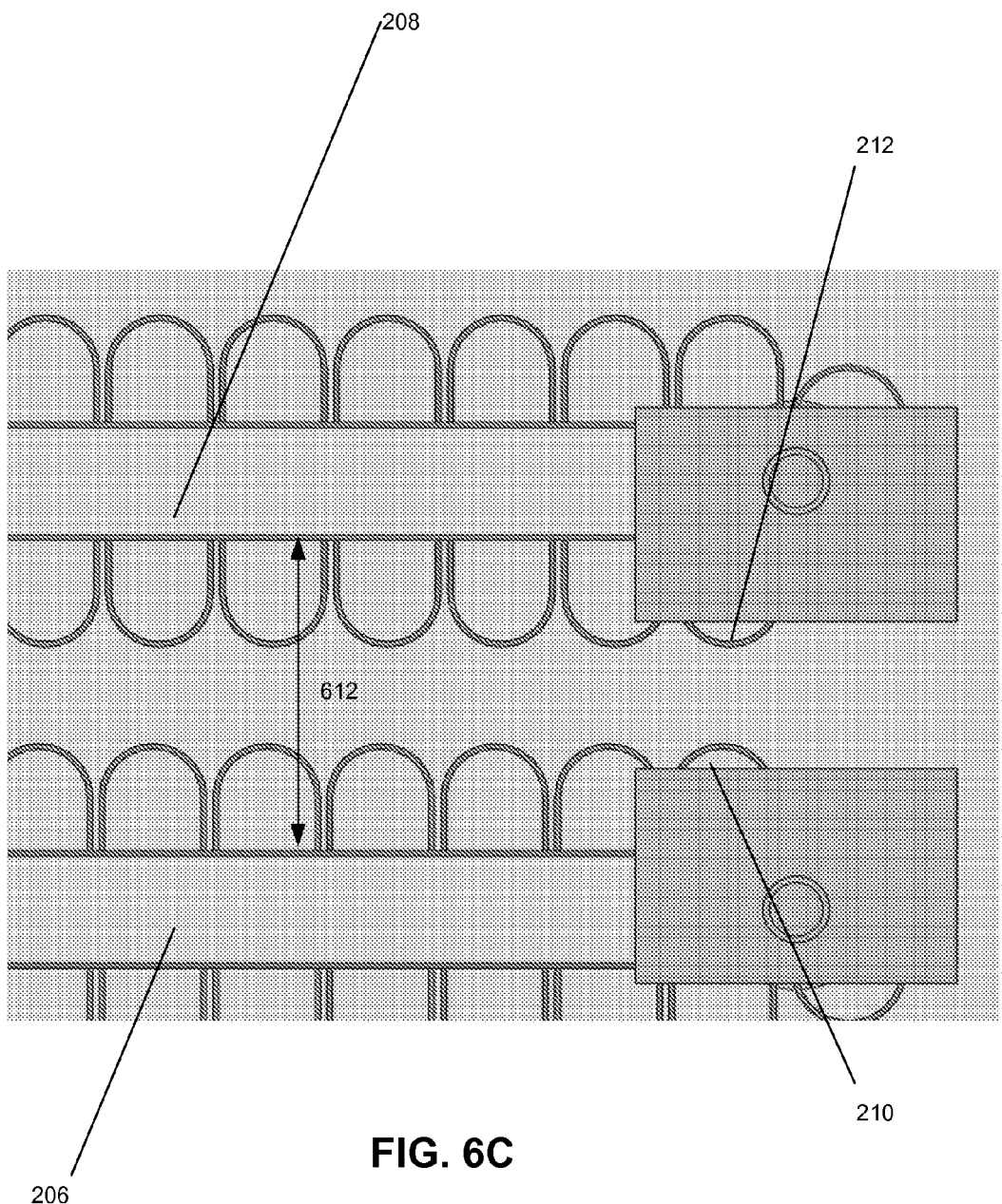
FIG. 6C illustrates another exemplary schematic of the movable belts of the mechanical harvester.

As depicted in FIG. 6C, a spacing 612 is defined between movable belts 206 and 208. Spacing 612 is adjusted for the produce that will be harvested with mechanical harvester 100 (FIG. 1). In the substantially parallel configuration, as can be seen in the top view depicted in FIG. 6C, spacing 612 is substantially consistent along the length of movable belts 206 and 208 so that the produce may be carried between movable belts 206 and 208 utilizing produce gripper 210 and opposing produce gripper 212.

Sets of produce grippers 210 and 212 are formed of a pliable material, such as a pliable plastic. The pliable material may be deformed such that the produce, when between movable belt 206 and movable belt 208, will compress produce gripper 210 and opposing produce gripper 212.

Also, as depicted in FIG. 6C and FIG. 10C, produce grippers 210 and 212 are aligned such that they directly oppose each other, particularly when the cut produce is disposed between them. Note, the intermeshing of produce grippers 210 and 212 seen in FIG. 2 is the result of the produce grippers 210 and 212 being pliable and the short spacing of movable belts 206 and 208 in FIG. 2. However, if the spacing of movable belts 206 and 208 is sufficient for produce grippers 210 and 212 to not contact each other, then grippers 210 and 212 directly oppose each other, as depicted in FIG. 6C.

As depicted in FIG. 8 and mentioned above, produce gripper 210 and opposing produce gripper 212 are compressed by lettuce head 702, because they are formed of pliable material. The rigidity of the material of the produce grippers determines the force exerted on the produce. The force exerted on the produce by each of the produce grippers is preferably at least approximately the same as the weight of the produce. The force exerted on the produce by each of the produce grippers is preferably at most approximately 200% of the weight of the produce so that the produce is not damaged.

Figure 9A:
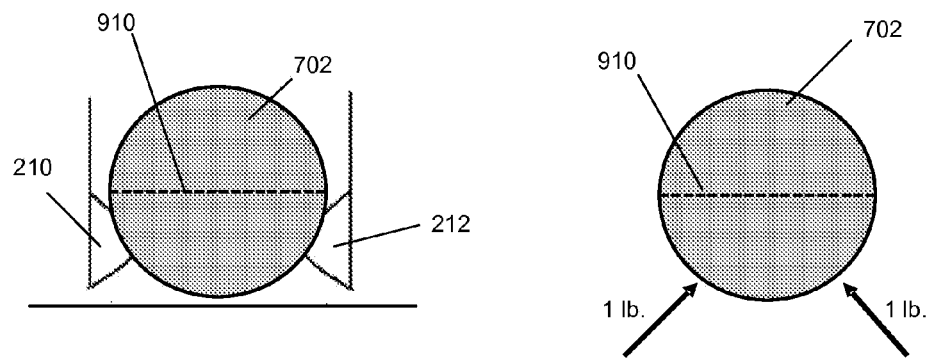
FIG. 9A illustrates an example of holding produce between produce grippers of the mechanical harvester.

In one example, as depicted in FIG. 9A, produce gripper 210 and opposing produce gripper 212 may contact lettuce head 702 below the midline 910 of lettuce head 702 to lift and hold the lettuce head 702. The force exerted by the produce gripper 210 may be approximately the weight of the produce. Similarly, the force exerted by opposing produce gripper 212 may be approximately the weight of the produce. Assume, for the purpose of this example, lettuce head 702 weighs one pound. As such, produce gripper 210 and opposing produce gripper 212 each exert approximately one pound of force on lettuce head 702 to hold lettuce head 702 between produce gripper 210 and opposing produce gripper 212.

Figure 9B:
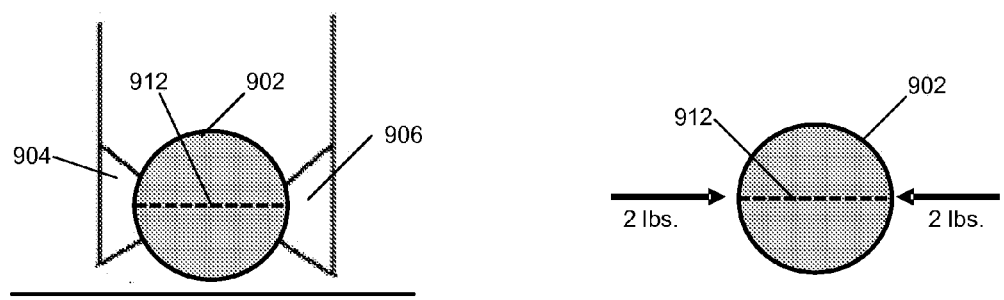
FIG. 9B illustrates another example of holding produce between produce grippers of the mechanical harvester.

In another example, as depicted in FIG. 9B, produce gripper 904 and opposing produce gripper 906 may contact lettuce head 902 at about the midline 912 of lettuce head 902 to lift and hold the lettuce head 902. In this example, the force exerted by both produce gripper 904 and opposing produce gripper 906 may be 200% of the weight of the produce so that lettuce head 902 is held between produce gripper 904 and opposing produce gripper 906. The direction of the force exerted on lettuce head 902 is primarily a lateral direction, requiring a greater force exerted by produce gripper 904 and opposing produce gripper 906 to hold lettuce head 902 off the ground than when the force exerted by the produce grippers has a greater vertical component, as depicted in FIG. 9A.

Figure 7:
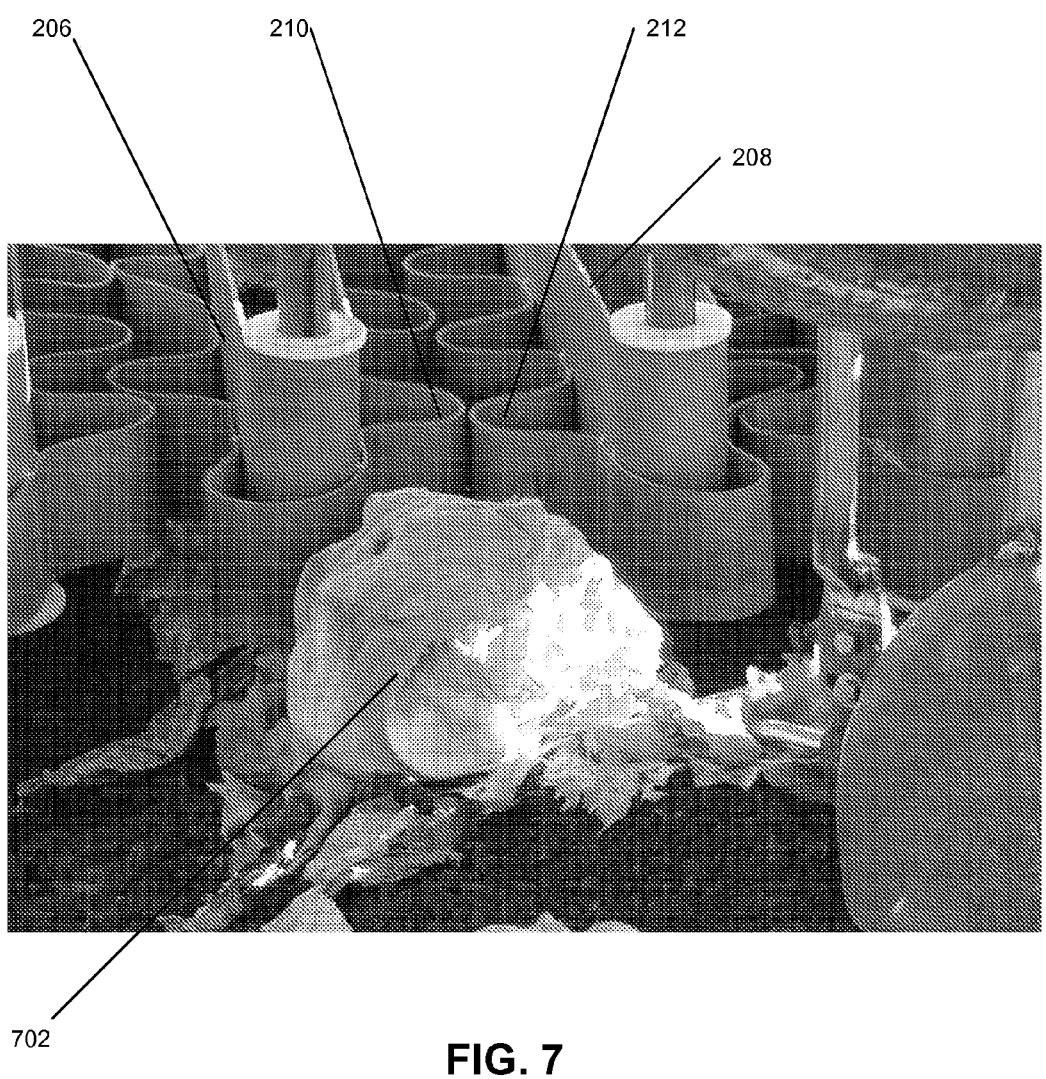
FIG. 7 illustrates an exemplary view of produce before it is cut by the cutting device of the mechanical harvester.
Figure 8:
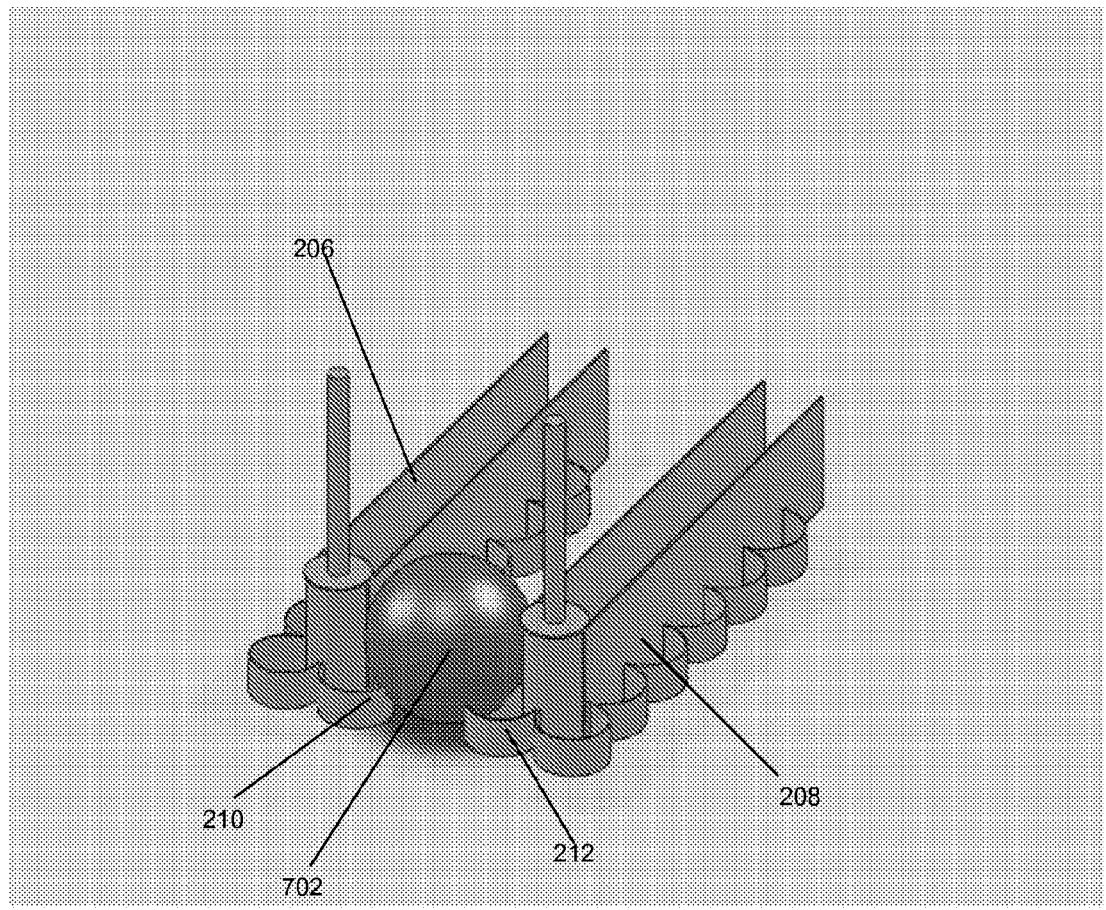
FIG. 8 illustrates an exemplary view of produce being held by the movable belts of the mechanical harvester.

As depicted in FIG. 7, produce gripper 210 and opposing produce gripper 212 are cog-like protrusions. The profile of the cog-like protrusions allows mechanical harvester 100 (FIG. 1) to be self-feeding. Also, as mentioned above, movable belts 206 and 208 may be configured to be inclined to facilitate lifting of the cut produce from the ground. In other words, the produce does not need to be pushed or placed into the conveyer-type movable belts. The cog-like profiles of produce gripper 210 and opposing produce gripper 212 contact the cut produce on the ground and, as movable belts 206 and 208 move, the cut produce is pulled between produce gripper 210 and opposing produce gripper 212. The cut produce deforms produce gripper 210 and opposing produce gripper 212. Once deformed, produce gripper 210 and opposing produce gripper 212 exert a sufficient amount of force to hold the produce between produce gripper 210 and opposing produce gripper 212 as described above. The self-feeding process increases the speed of harvesting and minimizes the number of personnel needed to operate the mechanical harvester. Furthermore, the shape of produce gripper 210 and opposing produce gripper 212 reduces the damage to the produce.

Produce gripper 210 and opposing produce gripper 212 are configured to not puncture the produce. In the embodiment shown in FIG. 7, the dimensions of produce gripper 210 and opposing produce gripper 212 are large enough, relative to the produce being harvested, to not damage the produce by puncturing or piercing. In one example, the heights of produce gripper 210 and opposing produce gripper 212 are at least approximately 50% of the height of a cut produce. For example, an average iceberg lettuce head is six inches in height. Produce gripper 210 and opposing produce gripper 212 for gripping iceberg lettuce may be three inches in height. However, it should be appreciated that, in other examples, the height of produce gripper 210 and opposing produce gripper 212 may be less than 50% of the height of the cut produce.

After a cut produce is lifted onto movable belts 206 and 208 and held by produce gripper 210 and opposing produce gripper 212, movable belts 206 and 208 are moved to transport the produce the length of the movable belt. In other words, the produce is held between produce gripper 210 and opposing produce gripper 212 to transport the produce from one end of movable belts 206 and 208 to the other end where the produce is deposited.

The transporting process is illustrated in FIGS. 10A, 10B, 10C, and 10D. As depicted in FIGS. 10A and 10B, the direction of travel of mechanical harvester 100 (FIG. 1) brings produce grippers 210 and 212 to the lettuce head 702. As depicted in FIGS. 10B and 10C, produce gripper 210 and opposing produce gripper 212 contact the lettuce head 702 to lift lettuce head 702 between produce gripper 210 and opposing produce gripper 212. As depicted in FIG. 10C, produce gripper 210 and opposing produce gripper 212 are configured to be compressed by lettuce head 702, such that a sufficient force is exerted on lettuce head 702 to hold lettuce head 702 between produce gripper 210 and opposing produce gripper 212. As depicted in FIG. 10D, while mechanical harvester 100 (FIG. 1) continues to travel through the field, movable belts 206 and 208 move so that lettuce head 702 between produce gripper 210 and opposing produce gripper 212 is transported toward the rear of mechanical harvester 100 (FIG. 1).

Figure 11:
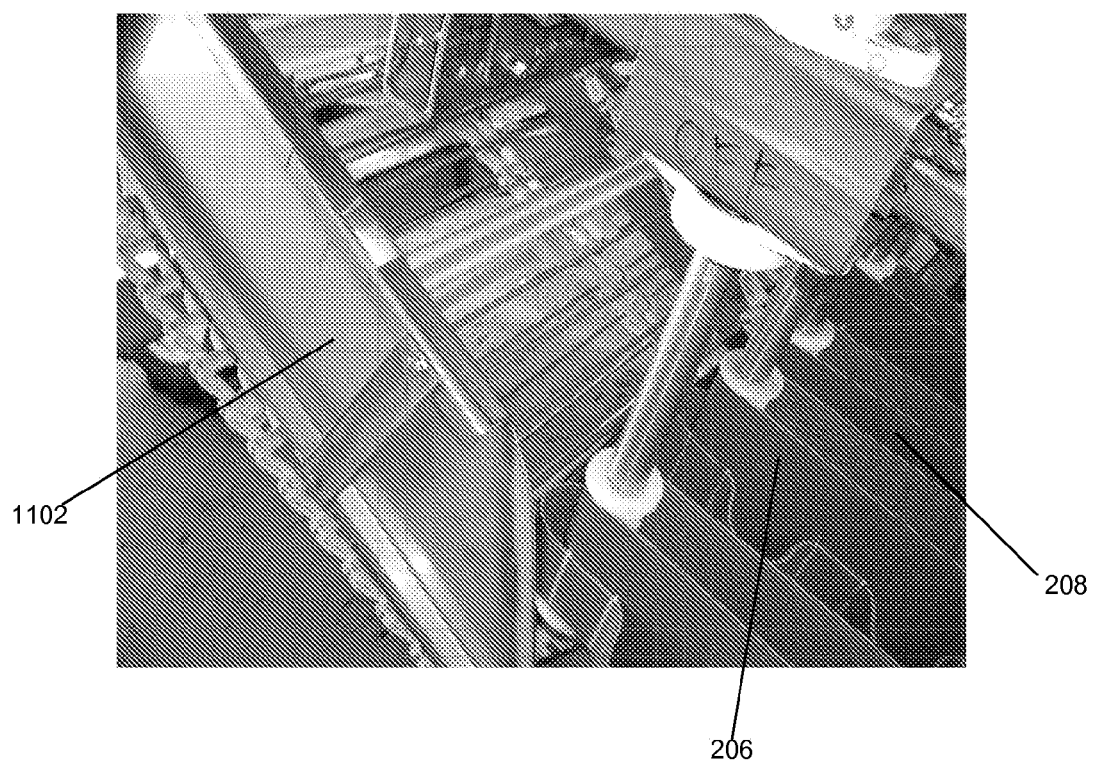
FIG. 11 illustrates an exemplary view of the backend of the mechanical harvester coupled to an elevator belt.

As depicted in FIG. 11, at the rear of mechanical harvester 100 (FIG. 1), movable belts 206 and 208 may deposit the produce onto a moving platform or an elevator belt 1102 to be transported to a processing platform for further processing. Processing steps may include, but are not limited to, decoring, sorting, trimming, washing, and packaging. The moving belts 206 and 208 may also deposit the produce into a storage bin (not shown).

Although the present invention has been described with respect to certain exemplary embodiments, examples, and applications, it will be apparent to those skilled in the art that various modifications and changes may be made without departing from the invention.

We claim:

1. A mechanical harvester for harvesting a produce planted in a field, the produce having a stem/core, the mechanical harvester comprising:
 a chassis;
 a cutting device, connected to the chassis, configured to cut the stem/core of the produce; and
 a transport assembly, connected to the chassis, configured to transport the produce cut by the cutting device, wherein the transport assembly comprises:
  a movable first belt, wherein the movable first belt includes a first set of deformable protrusions, wherein each deformable protrusion of the movable first belt has a peak; and
  a movable second belt, wherein the movable second belt includes a second set of deformable protrusions, wherein each deformable protrusion of the movable second belt has a peak,
   wherein, when a cut produce is held between the movable first and second belts, the cut produce is held between a peak of only one deformable protrusion, and not two or more deformable protrusions, of the movable first belt and a peak of only one directly opposing deformable protrusion, and not two or more deformable protrusions, of the movable second belt, and
   wherein the deformable protrusion of the movable first belt and the deformable protrusion of the movable second belt are configured to compress and exert a force on the produce to hold the produce between the movable first and second belts.

2. The mechanical harvester of claim 1, wherein the deformable protrusion of the movable first belt and the deformable protrusion of the movable second belt are configured to each exert a force of between approximately 100 percent and 200 percent of the weight of the produce to hold the produce.

3. The mechanical harvester of claim 1, wherein the deformable protrusion of the movable first belt and the deformable protrusion of the movable second belt each exert a force that is approximately the same as the weight of the produce to hold the cut produce.

4. The mechanical harvester of claim 1, wherein the movable first and second belts are positioned at an incline from a front end to a rear end of the transport assembly, wherein the front end is proximate to the cutting device.

5. The mechanical harvester of claim 1, wherein the first and second sets of deformable protrusions are formed of a pliable material.

6. The mechanical harvester of claim 1, wherein the movable first belt and the movable second belt are conveyor belts.

7. The mechanical harvester of claim 1, wherein the transport assembly further comprises:
 a movable third belt and a movable fourth belt, connected to the chassis, configured to hold and transport another produce between the third and fourth movable belts, wherein the movable third belt and the movable fourth belt are disposed adjacent to the movable first belt and the movable second belt.

8. A mechanical method of harvesting a produce planted in a field using a mechanical harvester, the plant having a stem/core, the method comprising:
 cutting the stem/core of the produce with a cutting device connected to a chassis of the mechanical harvester;

moving a transport assembly, connected to the chassis, to the cut produce, wherein the transport assembly comprises:
  a movable first belt; and
  a movable second belt,
    wherein the movable first belt includes a first set of deformable protrusions, wherein each deformable protrusion of the movable first belt has a peak, and wherein the movable second belt includes a second set of deformable protrusions, wherein each deformable protrusion of the movable second belt has a peak;
  holding the cut produce between a peak of only one deformable protrusion, and not two or more deformable protrusions, of the first movable belt and a peak of only one directly opposing deformable protrusion, and not two or more deformable protrusions, of the second movable belt, wherein the peak of the deformable protrusion of the movable first belt directly opposes the peak of the deformable protrusion of the movable second belt, and wherein the deformable protrusion of the first movable belt and the deformable protrusion of the second movable belt are configured to each compress and exert a force on the produce to hold the produce between the movable first and second belt.

9. The mechanical method of claim 8, further comprising:
transporting, by the transport assembly, the cut produce held between the deformable protrusion of the first movable belt and the deformable protrusion of the second movable belt to a processing platform connected to the rear of the mechanical harvester.

10. The mechanical method of claim 8, further comprising:
lifting the cut produce from the ground using the deformable protrusion of the first movable belt and the deformable protrusion of the second movable belt.

11. The mechanical method of claim 8, wherein the deformable protrusion of the first movable belt and the deformable protrusion of the second movable belt are configured in a peak-to-peak configuration to each compress and exert a force on the produce to hold the produce between the movable first and second belts.

12. A mechanical harvester for harvesting produce planted in a field, the produce having a stem/core, the mechanical harvester comprising:
  a chassis;
  a cutting device, connected to the chassis, configured to cut the stem/core of the produce; and
  a transport assembly, connected to the chassis, configured to transport the produce cut by the cutting device, wherein the transport assembly comprises:
    a movable first belt, wherein the movable first belt includes a first set of deformable protrusions, wherein each deformable protrusion of the movable first belt has a peak; and
    a movable second belt, wherein the movable second belt includes a second set of deformable protrusions, wherein each deformable protrusion of the movable second belt has a peak,
      wherein, when a cut produce is held between the movable first and second belts, the cut produce is held between a peak of only one deformable protrusion, and not two or more deformable protrusions, of the movable first belt and a peak of only one directly opposing deformable protrusion, and not two or more deformable protrusions, of the movable second belt, and
      wherein the deformable protrusion of the movable first belt and the deformable protrusion of the movable second belt are configured in a peak-to-peak configuration to compress and exert a force on the produce to hold the produce between the movable first and second belts.

13. The mechanical harvester of claim 12, wherein the deformable protrusion of the movable first belt and the deformable protrusion of the movable second belt are configured to each exert a force of between approximately 100 percent and 200 percent of the weight of the produce to hold the produce.

14. The mechanical harvester of claim 12, wherein the deformable protrusion of the movable first belt and the deformable protrusion of the movable second belt each exert a force that is approximately the same as the weight of the produce to hold the cut produce.

15. The mechanical harvester of claim 12, wherein the movable first and second belts are positioned at an incline from a front end to a rear end of the transport assembly, wherein the front end is proximate to the cutting device.

16. The mechanical harvester of claim 12, wherein the first and second sets of deformable protrusions are formed of a pliable material.

17. The mechanical harvester of claim 12, wherein the movable first belt and the movable second belt are conveyor belts.

18. The mechanical harvester of claim 12, wherein the transport assembly further comprises:
  a movable third belt and a movable fourth belt, connected to the chassis, configured to hold and transport another produce between the third and fourth movable belts, wherein the movable third belt and the movable fourth belt are disposed adjacent to the movable first belt and the movable second belt.

19. The mechanical harvester of claim 1, wherein the cut produce is held below or at about the midline of the cut produce between a peak of only one deformable protrusion, and not two or more deformable protrusions, of the movable first belt and a peak of only one directly opposing deformable protrusion, and not two or more deformable protrusions, of the movable second belt.

20. The mechanical harvester of claim 19, wherein the cut produce is held below the midline of the cut produce between a peak of only one deformable protrusion, and not two or more deformable protrusions, of the movable first belt and a peak of only one directly opposing deformable protrusion, and not two or more deformable protrusions, of the movable second belt.

21. The mechanical harvester of claim 20, wherein the deformable protrusion of the movable first belt and the deformable protrusion of the movable second belt are configured to each exert a force of between approximately the same as the weight of the produce to hold the cut produce.

22. The mechanical harvester of claim 19, wherein the cut produce is held at about the midline of the cut produce between a peak of only one deformable protrusion, and not two or more deformable protrusions, of the movable first belt and a peak of only one directly opposing deformable protrusion, and not two or more deformable protrusions, of the movable second belt.

23. The mechanical harvester of claim 22, wherein the deformable protrusion of the movable first belt and the deformable protrusion of the movable second belt each exert a force that is approximately 200 percent of the weight of the produce to hold the produce.

24. The mechanical method of claim 8, wherein the cut produce is held below or at about the midline of the cut produce between a peak of only one deformable protrusion, and not two or more deformable protrusions, of the movable first belt and a peak of only one directly opposing deformable protrusion, and not two or more deformable protrusions, of the movable second belt.

25. The mechanical method of claim 24, wherein the cut produce is held below the midline of the cut produce between a peak of only one deformable protrusion, and not two or more deformable protrusions, of the movable first belt and a peak of only one directly opposing deformable protrusion, and not two or more deformable protrusions, of the movable second belt.

26. The mechanical method of claim 25, wherein the deformable protrusion of the movable first belt and the deformable protrusion of the movable second belt are configured to each exert a force of between approximately the same as the weight of the produce to hold the cut produce.

27. The mechanical method of claim 24, wherein the cut produce is held at about the midline of the cut produce between a peak of only one deformable protrusion, and not two or more deformable protrusions, of the movable first belt and a peak of only one directly opposing deformable protrusion, and not two or more deformable protrusions, of the movable second belt.

28. The mechanical method of claim 27, wherein the deformable protrusion of the movable first belt and the deformable protrusion of the movable second belt each exert a force that is approximately 200 percent of the weight of the produce to hold the produce.

29. The mechanical harvester of claim 12, wherein the cut produce is held below or at about the midline of the cut produce between a peak of only one deformable protrusion, and not two or more deformable protrusions, of the movable first belt and a peak of only one directly opposing deformable protrusion, and not two or more deformable protrusions, of the movable second belt.

30. The mechanical harvester of claim 29, wherein the cut produce is held below the midline of the cut produce between a peak of only one deformable protrusion, and not two or more deformable protrusions, of the movable first belt and a peak of only one directly opposing deformable protrusion, and not two or more deformable protrusions, of the movable second belt.

31. The mechanical harvester of claim 30, wherein the deformable protrusion of the movable first belt and the deformable protrusion of the movable second belt are configured to each exert a force of between approximately the same as the weight of the produce to hold the cut produce.

32. The mechanical harvester of claim 29, wherein the cut produce is held at about the midline of the cut produce between a peak of only one deformable protrusion, and not two or more deformable protrusions, of the movable first belt and a peak of only one directly opposing deformable protrusion, and not two or more deformable protrusions, of the movable second belt.

33. The mechanical harvester of claim 32, wherein the deformable protrusion of the movable first belt and the deformable protrusion of the movable second belt each exert a force that is approximately 200 percent of the weight of the produce to hold the produce.

* * * * *